UNITED STATES PATENT OFFICE.

JOHN MAYER, OF PHILADELPHIA, PENNSYLVANIA.

IMPROVEMENT IN LINIMENTS.

Specification forming part of Letters Patent No. 217,808, dated July 22, 1879; application filed May 23, 1879.

*To all whom it may concern:*

Be it known that I, JOHN MAYER, of the city and county of Philadelphia, and State of Pennsylvania, have invented a new and useful Remedy for Rupture, which is fully described in the following specification.

In carrying out my invention, I take deer-fat, one-fourth pound; pure butter, three-fourths pound; expressed juice of juniper-berries, four ounces; linseed-oil, eight ounces; sweet-oil, five ounces; turpentine, five ounces; pure rye whisky, four ounces.

The butter is first rendered in a clean new earthenware pot. This produces at top scum or foam and at bottom a sediment, leaving the center portion pure butter, which alone is to be used.

In a new clean pot I place the deer-fat and add two ounces of the pure butter, and melt the two together, and then add slowly the remainder of the butter, working the mass with a wooden pestle for two or three hours, in a cool place, without interruption, after which—say every five minutes—each of the several other ingredients is added, until the whole has been thoroughly mixed, the product being a liniment which is to be applied externally to the affected places.

The whisky should be what is known as "first-run."

Having thus described my invention, what I claim as new, and desire to secure by Letters Patent, is—

The composition of matter forming a remedy for rupture, the same consisting of deer-fat, pure butter, juice of juniper-berries, linseed-oil, sweet-oil, turpentine, and pure whisky, as set forth.

JOHN MAYER.

Witnesses:
C. F. WOERNER,
JOHN A. WIEDERSHEIM.